United States Patent
Thomas

(10) Patent No.: US 7,667,761 B2
(45) Date of Patent: Feb. 23, 2010

(54) OPTICAL IMAGING DEVICE FOR SPLITTING AN INITIAL IMAGE INTO AT LEAST TWO IMAGES

(75) Inventor: Martin Thomas, Faversham (GB)

(73) Assignee: Cairn Research Limited (GB)

( * ) Notice: Subject to any disclaimer, the term of this patent is extended or adjusted under 35 U.S.C. 154(b) by 624 days.

(21) Appl. No.: 11/167,442

(22) Filed: Jun. 27, 2005

(65) Prior Publication Data

US 2006/0007343 A1    Jan. 12, 2006

(30) Foreign Application Priority Data

Jul. 6, 2004  (GB) ................... 0415115.5
Dec. 3, 2004  (GB) ................... 0426524.5

(51) Int. Cl.
    *G02B 13/16*    (2006.01)
(52) U.S. Cl. ............... 348/335; 348/336; 356/300; 356/390
(58) Field of Classification Search ............ 348/335
    See application file for complete search history.

(56) References Cited

U.S. PATENT DOCUMENTS 6,814,484 B2 * 11/2004 Yano et al. ................. 374/121
6,856,459 B1 *  2/2005 Islam et al. ................ 359/485

FOREIGN PATENT DOCUMENTS

GB        2162334 A  *  1/1986

* cited by examiner

*Primary Examiner*—Jason Chan
*Assistant Examiner*—Cynthia Calderon
(74) *Attorney, Agent, or Firm*—Barnes & Thornburg LLP

(57) ABSTRACT

There is provided an optical imaging device (18) for splitting an initial image into at least two images with different optical characteristics. The device comprises a dichroic mirror (32) to create first and second optical pathways respectively incident on first and second mirrors (41, 41') carried on a centrally pivoted rotatable arm, characterised in that the first and second reflective means are moveable along the arm (42) whilst held in fixed relationship to each other, thereby to adjust separation of the first and second optical pathways. A third mirror (46) in fixed relationship to the beam splitter (32) is positioned adjacent where the first and second optical pathways intersect, or just before the intersection of the first and second optical pathways, or just after the point of intersection.

7 Claims, 6 Drawing Sheets

OPTICAL IMAGING DEVICE FOR SPLITTING AN INITIAL IMAGE INTO AT LEAST TWO IMAGES

This invention relates to an optical imaging device, and in particular to a device capable of splitting a single optical image into further images.

BACKGROUND TO THE INVENTION

Within complex optical systems, optical imaging devices are used for manipulation of an optical image. Devices which allow an image to be split into a plurality of images with different optical characteristics are often used within spectroscopes or spectral imagers. The different images have, for example, different wavelengths or different polarisations, and can be viewed simultaneously to give information about a sample being examined under a microscope.

Prior art devices used for producing the images with different optical characteristics are often complex, and can introduce optical aberrations which complicate assessment of the plurality of images.

It is an aim of the present invention to provide a simplified optical imaging device which essentially reduces optical aberrations.

SUMMARY OF THE INVENTION

In accordance with one aspect of the present invention, there is provided an optical imaging device for splitting an initial image into at least two images with different optical characteristics, wherein the device comprises a beam splitter to create first and second optical pathways respectively incident on first and second reflective means carried on a centrally pivoted rotatable arm, characterised in that the first and second reflective means are moveable along the arm whilst held in fixed relationship to each other, thereby to adjust separation of the first and second optical pathways. By having the first and second reflective means moveable along the arm, but yet the first and second reflective means remaining fixed relative to one another, the characteristics of the optics preceding the optical imaging device, for example a microscope in which the optical imaging device is placed so as to allow spectroscopic analysis, are no longer relevant to adjustment of the optical pathways.

The beam splitter will typically be a dichroic mirror which reflects a proportion of incident light whilst transmitting the remainder of the incident light. Other types of beam splitters which may be used include polarising beam splitters. The dichroic mirror may be coated so as to alter the optical characteristics of both, or either of, the reflected and transmitted light. Additional optical elements, such as filters, may be placed in the optical pathways.

Preferably the first and second reflective means are mirrors, which again may be provided with coatings or modified in other ways so as to alter the optical characteristics along the optical pathways. Movement of the first and second reflective means along the arm allows the position of the first optical pathway to be adjusted relative to the second optical pathway prior to recombination at an output. This allows adjustment of the optical pathways to match the preceding optics, and allows the first and second optical pathways to be placed as close together as possible whilst avoiding overlap.

Preferably a third reflective means, such as another mirror, in fixed relationship to the beam splitter is positioned adjacent where the first and second optical pathways intersect so as to deflect one, or the first, optical pathway to a first focussing element, such as a lens, for recombination with the other, or the second, optical pathway.

The third reflective means may be positioned just before the intersection of the first and second optical pathways, as shown in FIGS. 3 and 7, which partially obstructs the undeflected pathway. However this allows the focussing element to be positioned closer to the first and second reflective means. In such an embodiment an edge of the third reflective means can be cut away at an angle to avoid any obstruction to the undeflected optical pathway.

Alternatively the third reflective means may be positioned just after the point of intersection, see FIGS. 5 and 6, so as to avoid obstruction of the undeflected pathway.

The orientation of the third reflective means may be adjusted dependent on whether an input beam to the device is to be parallel or at right angles to an output beam.

If desired the third reflective means may be omitted and first and second focussing elements used to focus the first and second optical pathways respectively, the pathways intersecting, but not recombining, before reaching their respective focussing elements.

The invention will now be described, by way of example, with reference to the accompanying drawings in which.

DESCRIPTION

Figure 1:
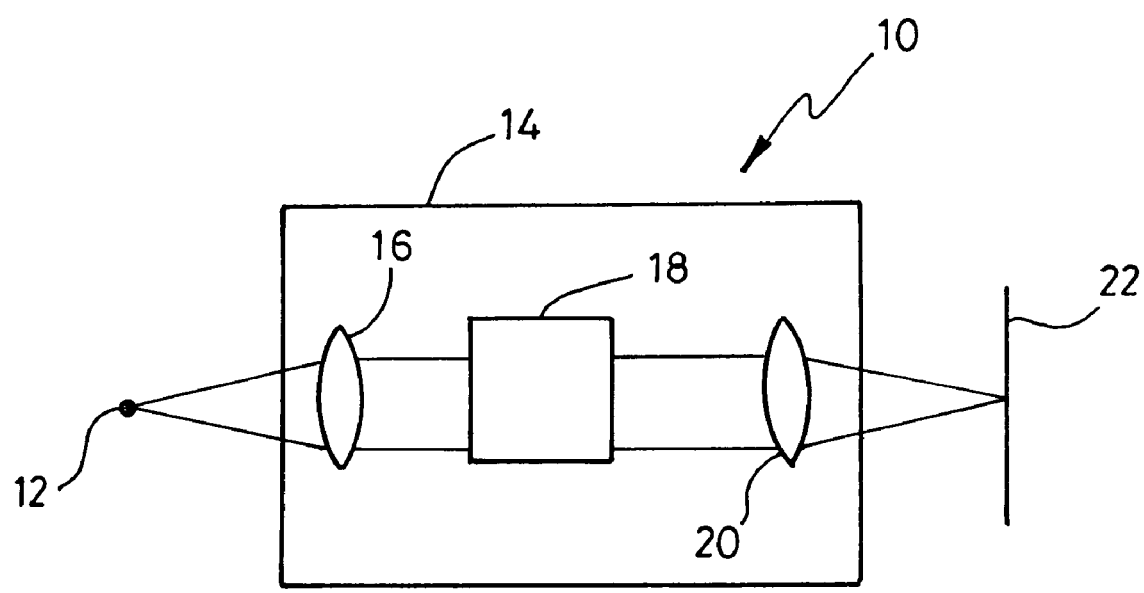
FIG. 1 shows a schematic diagram of optical imaging apparatus incorporating an optical imaging device in accordance with the present invention.

FIG. 1 shows a schematic diagram of an optical system 10 used for obtaining an image from a sample 12, for example as in fluorescence and spectroscopic analysis, ratiometric ion imaging, dual probe imaging, fluorescence resonance energy transfer or total internal reflection fluorescence.

The optical system comprises a microscope 14 which includes an objective lens 16 for receiving light from the sample 12 so as to create an image, an optical imaging device 18 mounted on a microscope port and for splitting the image into two or more further images with different optical characteristics, and an imaging lens 20 for focussing these images on output to an image receiving surface 22 such as a solid state imaging device or a detector array.

As is known in the art, the transmission of light through any optical system is limited by the size of the various apertures within it. Some of these apertures are there by physical necessity, for example the finite diameters of various lenses and other optical components, and others are selected in order to give the system specific characteristics. An aperture may be used to limit a field of view, for example of a specimen that is being imaged. In order to do this, the aperture must be in focus when the image of the object is in focus: this is known as a field iris. An aperture may also be used to control the amount of light transmitted by the system and in microscopy this is known as a condenser iris on the illumination side, and an exit pupil on the light collection side. The condenser iris must not be in or near focus with the object. Whereas a field iris sets the lateral displacement from the optical axis (i.e. centre of field) over which the object can be seen, a condenser iris or exit pupil sets the range of angles over which light can be collected from the object and re-imaged.

In the system shown in FIG. 1, typically an adjustable rectangular aperture is placed at an image plane prior to the input to the splitter 18, so as to provide a field iris to limit the extent of the image seen by the camera 22. This allows multiple images to be focussed onto the camera by the splitter 18 without the images overlapping.

The images obtained by the microscope 14 are usually viewed at high magnification, with the effect of magnifying an image being to correspondingly reduce the range of angles that the imaging light subtends to the optical axis. Thus the greater the magnification, the more closely the image-forming light approximates to a parallel beam, and therefore the beam divergence becomes less with magnification. By keeping the overall path length through the splitter 18 as short as possible, and by using optical components of reasonably large diameter relative to the beam, the beam divergence remains below a diameter at which significant optical aberration occurs.

Figure 2:
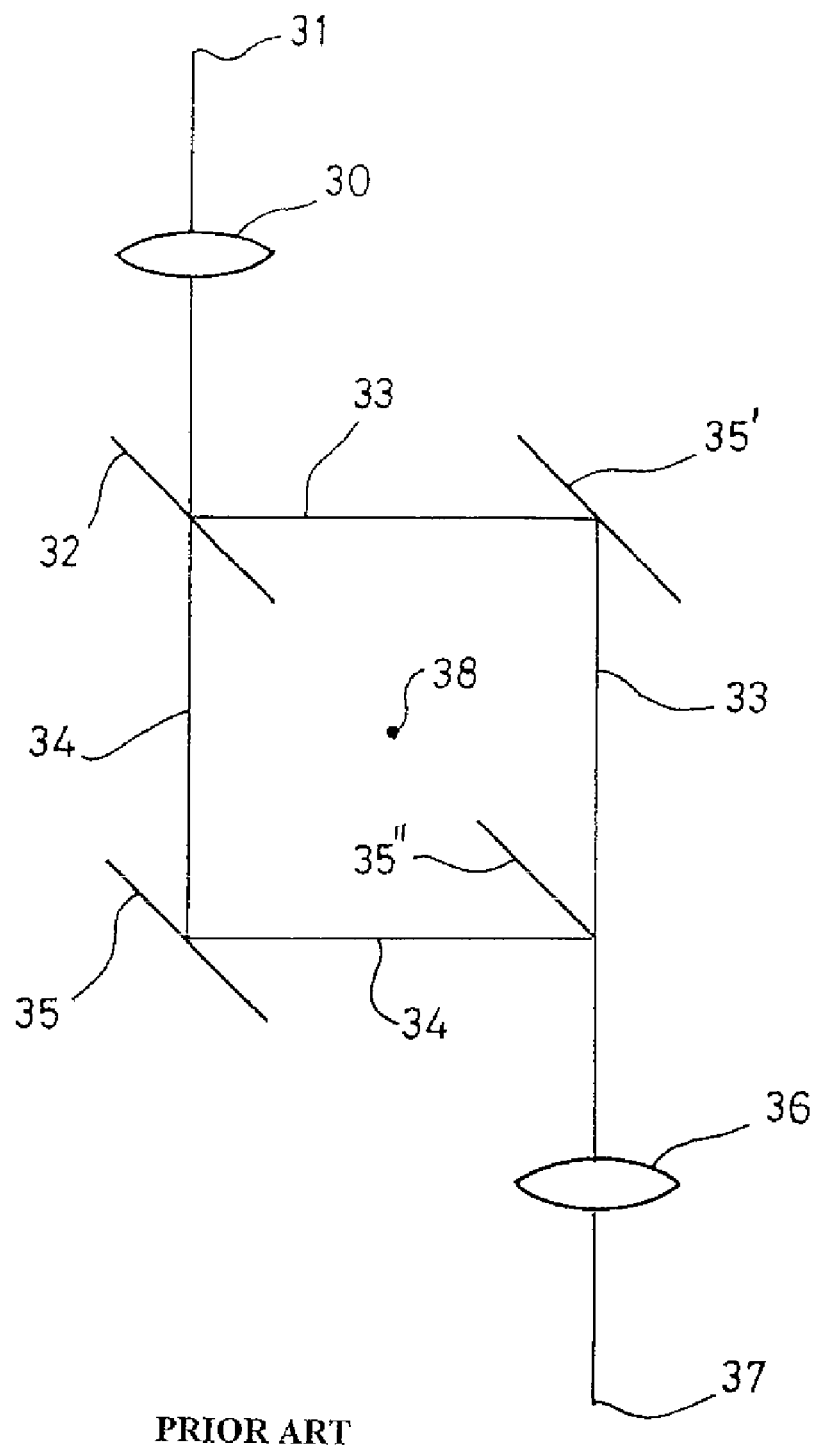
FIG. 2 shows a prior art optical imaging device.

A prior art image splitter is shown in FIG. 2. The image splitter comprises a lens 30 which acts as a collimator for light coming from an input image plane 31, and a dichroic mirror or polariser 32 which transmits a proportion of the light incident upon it, and reflects the remainder so as to split the original image into two successive images which follow different optical pathways 33, 34 as defined by mirrors 35, 35' and 35". The two images which follow the two optical pathways defined within the image splitter are focussed by lens 36 before simultaneous output to an output image plane 37, such as that defined at a detector which allows recording and analysis of the two images that have been derived from the original image. The optical distance between lenses 30 and 36 is close to the sum of their focal lengths.

Thus light from the image plane is collimated by lens 30, and then split into two essentially equal pathways by dichroic mirror 32 which is oriented slightly clockwise with respect to an exact 45° angle. The beam transmitted by dichroic mirror 32 is redirected by 45° mirror 35 and reflected by mirror 35" towards the output focussing lens 36. The beam reflected by mirror 32 is reflected by 45° mirror 35' and passes by the side of mirror 35" to be focussed by lens 36. Separation of the two images at the output is effected by anticlockwise rotation of mirrors 35 and 35'. To achieve equal rotation, mirrors 35 and 35' are mounted on a common carrier which rotates around a pivot 38. The rotation also physically separates the two beams at mirror 35" so that the beam reflected from mirror 35 falls entirely on mirror 35", whereas the beam reflected from mirror 35' passes completely to the right of 35".

The light reflected by dichroic mirror 32 arrives at mirror 35' somewhat lower and to the right than the transmitted light arriving at mirror 35", and mirrors 35 and 35' are biased slightly clockwise to compensate. Mirror 35" is also biased slightly clockwise to match the rotation of mirror 35. The effect of this is that even at zero image separation the two beams may not overlap at the position of mirror 35". However the two beams should not be separated by more than necessary at mirror 35", otherwise their centres will be further away from the optical axis of lens 36 than they need to be, which will require lens 36 to operate at a faster focal ratio, which will in turn increase the aberrations from lens 36. Image splitters are usually sold as add-on devices, and there is no way of knowing the characteristics of the optical system to which the splitter is going to be connected, even though the characteristics of the optical system will influence the beam diameters at the location of mirror 35", and thus the required centre spacing. For example, one cannot predict where the exit pupil of an unknown optical device will be.

Where a microscope is operating at high magnifications, there are very long focal ratios and the collimated beams between lenses 30 and 36 will generally not diverge very much so reducing the possible problems with beam separation at mirror 35".

However where magnification is not particularly high, the greater beam divergence between lenses 30 and 36 requires a greater beam separation within the splitter, so that optical pathway 33 is still entirely unobstructed by mirror 35" and optical pathway 34 is still entirely reflected by it. In order to deal with worst-case conditions the beam separation at lens 36 may therefore be large enough for this lens to produce significant aberration, as the light pathways are further off-axis. An image splitter in accordance with the present invention, see FIG. 3, allows the beam separation to be adjusted without affecting the separation of the focussed images, so that it is no greater than required for the above criterion to be met in that particular case. The aberrations produced by lens 36 will therefore be correspondingly reduced, and the device can be used at both high and low magnifications.

Figure 3:
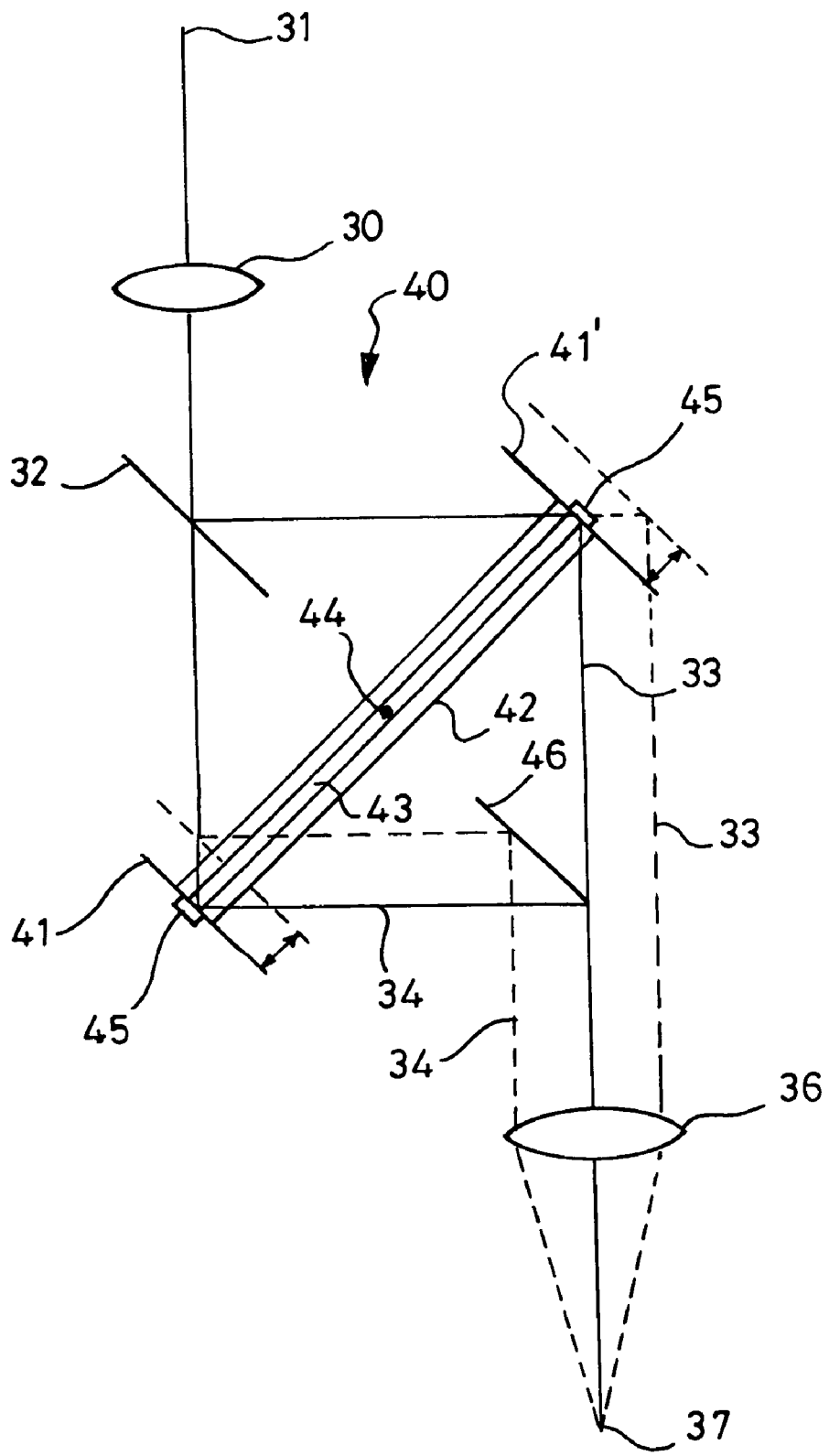
FIG. 3 shows a schematic diagram of one embodiment of an optical imaging device in accordance with the present invention.

In the image splitter 40 of FIG. 3, mirrors 41 and 41' are carried on an arm or hub 42 rotatable about pivot point or central axle 44. The arm 42 has a central track or slot 43 running along its length and in which a carriage 45 bearing both 45° mirrors 41 and 41' is moveable. Mirrors 41 and 41' are carried on the same rectangular carriage so as to be held in a fixed relationship to each other. Sliding movement of the carriage 45 along the arm 42 by a distance x moves mirror 41 closer to axis point 44 by x and moves mirror 41' away from axis point 44 by x. Thus mirrors 41 and 41' always remain the same distance from each other but their distance from point 44 can be adjusted. Typically the carriage 45 will be moved manually and then locked in position by a locking screw.

Figure 4:
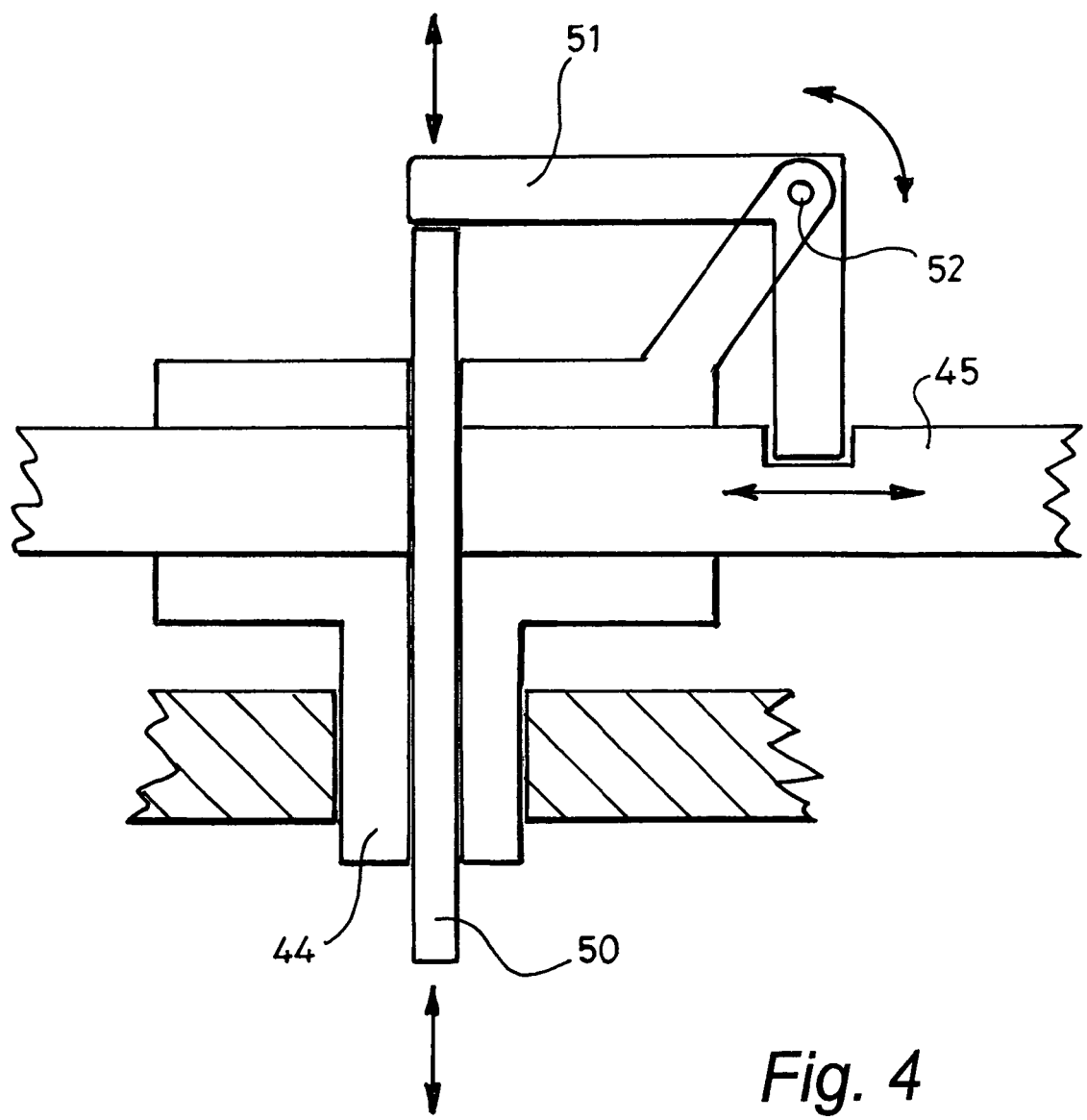
FIG. 4 shows a mechanism for use in the optical imaging device.

Alternatively an arrangement as shown in FIG. 4 can be used. The mirror adjustment mechanism of FIG. 4 operates a vertically moveable pushrod 50 that comes up through the centre of the axle 44 which pushes against a 90 degree crank, which is aligned along the mirror bar or carriage 45. Both the top end of the pushrod 50 and the pivot 52 for the crank are some way above the mirror bar 45 with the pivot being horizontal and at right angles to the axis of the bar, and fixed to the hub so that it rotates with it. The other end of the crank 51 passes down into the bar 45, so that as the pushrod goes up and down, the crank 51 converts this to the appropriate sliding movement of the bar 45. Operation will be against a return spring to prevent backlash. There is no interaction with the rotation of the bar, since this would merely cause the point of contact of the pushrod with the crank to rotate.

Two positions of mirrors 41 and 41' are shown in FIG. 3. At the position shown in solid lines, mirrors 41 and 41' are equidistant from point 44. At the position shown in dashed lines, mirrors 41 and 41' have been slid along the groove 43 on their common carriage 45, so that mirror 41 moves towards point 44 by the same amount that mirror 41' moves away from point 44. This increases separation of the two beams at mirror 46, the adjustment being made such that according to their actual diameters at this point, the beam following pathway 33 is entirely unobstructed by mirror 46, while the beam following pathway 34 is entirely reflected by it. This adjustment, being made in an infinity space for the imaging light, does not affect the separation of the images produced by lens 36, but it does affect the combined diameter of the two beams at lens 36, and hence also the aberrations introduced by this lens. The movement of the mirrors fixed to the carriage along the arm allows a user to redefine the geometry of the reflecting space to match the preceding optics. So whilst the splitter is typically set up in a square geometry, as shown by the solid lines, movement of the carriage alters where the optical pathways impinge upon the mirrors 41, 41' and 46 to define a rectangular geometry, with, in particular, the point at which optical pathway 34 impinges upon mirror 46 altering.

As the position of the carriage is adjustable to allow the optical pathways of the splitter to be altered to match the preceding optics, whose characteristics will always be unknown at point of sale, the dichroic mirror 32 is positioned at exactly 45°.

Ideally, the two beams are only separated by the minimum distance necessary to prevent overlap, which is simple to do given the ease of sliding the carriage relative to the axis 44. Also mirror 46 can have its reflective surface angled back at 45° at the edge closest to beam 33 so as to avoid any obstruction to beam 33. Too much separation will require lens 36 to operate at a faster focal ratio, so increasing aberrations from the lens, which is not desirable.

The splitter of FIG. 3, thus provides a way of adjusting the beam separation at mirror 46, independently of the separation of the two images, i.e. independently of the original imaging aperture.

Figure 5:
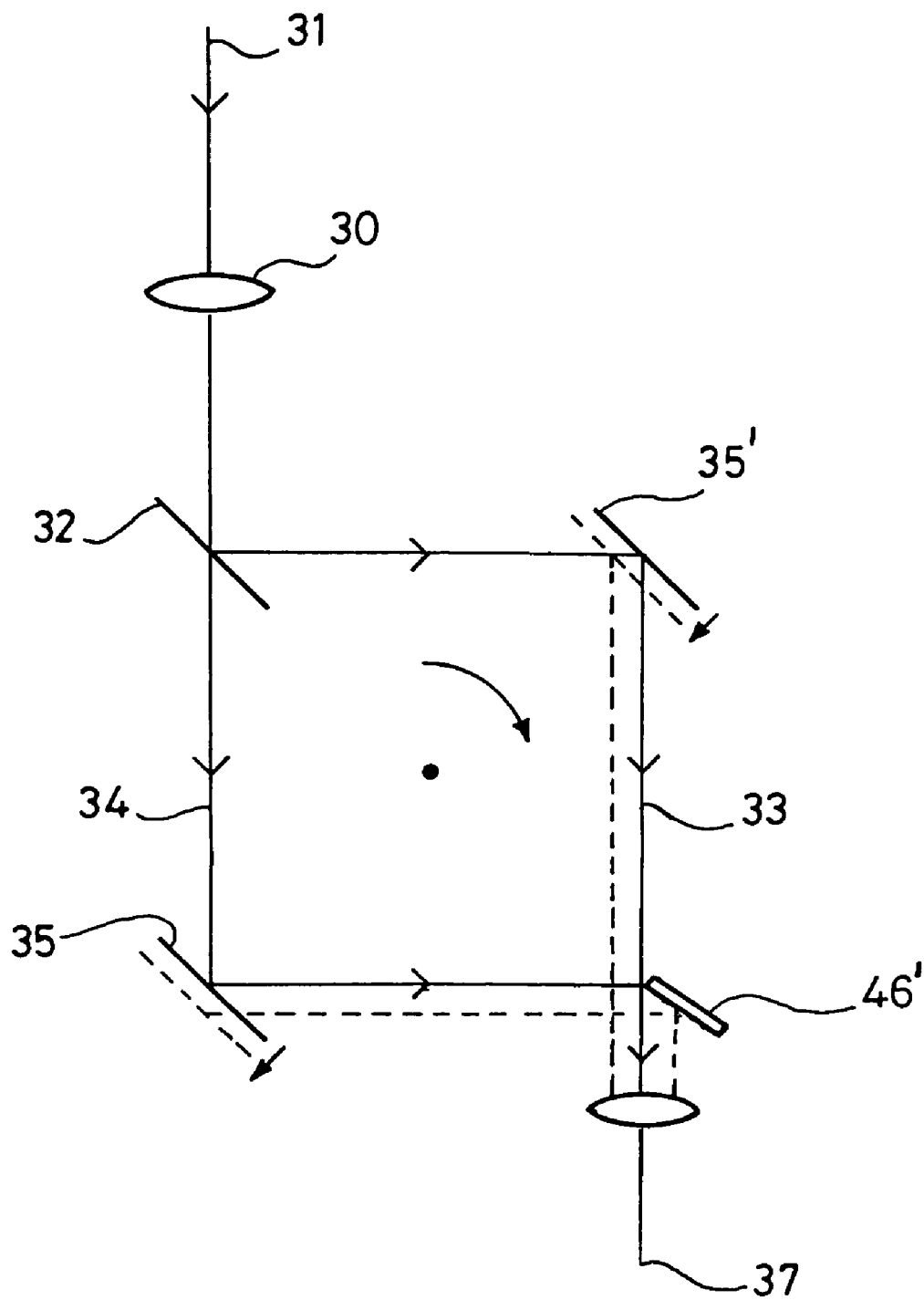
FIGS. 5 to 7 show further embodiments of the optical imaging device.
Figure 6:
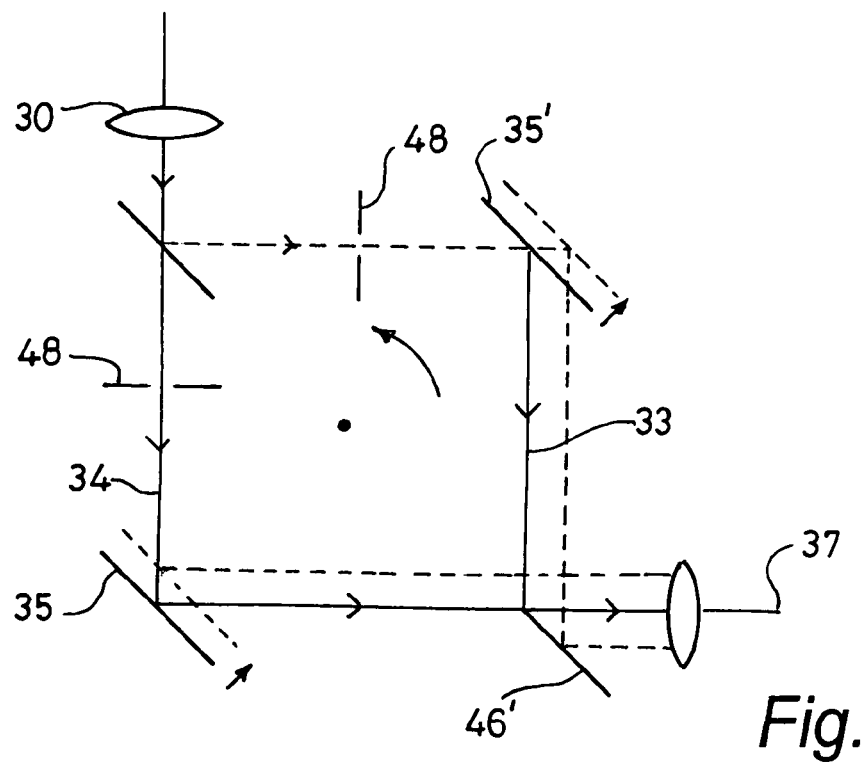
Figure 7:
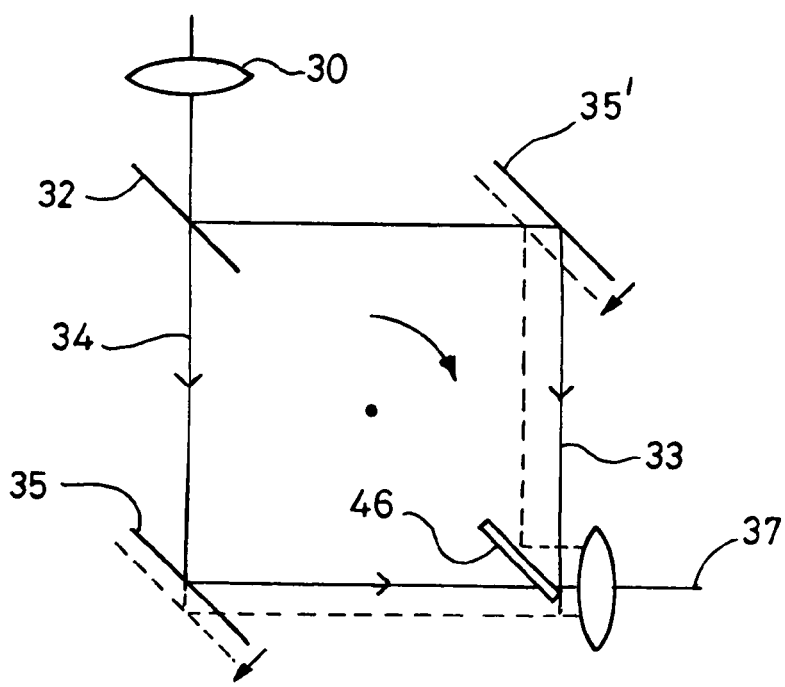

FIGS. 5, 6 and 7 show further embodiments of the basic splitter shown in FIG. 3.

In FIG. 5, mirror 46' is positioned just after the point of intersection of the two beams, in fixed relation to splitter 32. The finite thickness of the half-length mirror 46' does not obstruct beam 33.

The direction of rotation is selected so as to increase the separation of the two beams at the half-length mirror 46, 46', so as to require less linear displacement of mirrors 41, 41'. Whilst the preferred direction of rotation for the embodiment shown in FIG. 3 is anticlockwise, for the embodiment shown in FIG. 5, the preferred direction of rotation is clockwise. Thus for the configurations shown in FIGS. 3 and 6, ideally rotation is anticlockwise, and for FIGS. 5 and 7 rotation is clockwise. However the implementations shown would still work if rotation was in the opposite direction to that which is preferred.

In the embodiments shown in FIGS. 6 and 7, the exit beam is at right angles to the input beam instead of being parallel with it as for the embodiments shown in FIGS. 3 and 5. This is achieved by reversing the orientation of the half-length mirror 46, 46'. The embodiment shown in FIG. 6 shares the advantage of the embodiment shown in FIG. 5 that the thickness of the substrate of mirror 46' does not affect the functioning of the splitter. The embodiment shown in FIG. 7 is able to have the refocussing lens 36 positioned closer to the rotating mirror pair 41, 41', as can the embodiment shown in FIG. 3, thereby slightly reducing the length of the infinity space between lenses 30 and 36.

If required, adjustable iris diaphragms 48 are placed in the pathways from the beam splitter 32 to obstruct the beams and so allow the intensities of beams 33 and 34 to be adjusted independently. This is useful if one beam is significantly brighter than the other and allows the intensities of the beams to be adjusted to be approximately the same. This is particularly useful if both beams are being imaged at the same projector. The diaphragms 48 are ideally placed one focal length before the refocussing lens 36, so that they are completely out of focus at the final image.

Two or more of the embodiments shown may be combined, for example those shown in FIGS. 5 and 6, or those shown in FIGS. 3 and 7, so as to provide two refocussing lenses at 90° to each other. This allows either one or two cameras to be used at the output. If no half-mirror 46, 46' is fitted, then light paths 33 and 34 intersect to cross over and are focussed independently onto two detectors. In such a case, the rotating mirror pair 41, 41' would be left in a neutral position giving equal path lengths within the image splitter for beams 33 and 34.

As will be apparent to one skilled in the art, other optical elements can be used instead of mirrors, for example gratings, prisms, or polarisers. Optical elements such as filters, polarisers etc. can also be used in combination with the mirrors. For the arrangement shown in FIG. 3, typically one filter is disposed between the splitter 32 and the mirror 41. A second filter can be placed between splitter 32 and mirror 41', in which case the dichroic mirror and filters can be mounted together in a readily interchangeable assembly. Alternatively the second filter can be placed between mirror 41' and mirror 46 which allows the filters to be mounted in a common carrier which can be interchanged independently of the dichroic mirror.

The preceding optics, especially if working at high magnification such as a microscope, may introduce significant chromatic aberration. When image separation is carried out on the basis of wavelength, it may no longer be possible for both images to be in sharp focus. However, this situation can be alleviated by including corrector optics in the split pathways. In the configuration shown in FIG. 3, they should ideally be placed as close as possible to mirror 46. Typically, either a single lens of the minimum power to perform the correction can be disposed in either pathway 33 or 34 as appropriate, or more powerful lenses can be placed in both pathways, with chromatic correction being performed by varying the relative distance of these two lenses from mirror 46. If these lenses are of appropriately higher power, then lens 36 can be omitted. Although mirror 46 is no longer in infinity space as far as the imaging light is concerned, the operation of the splitter is essentially unchanged as long as these lenses are placed relatively close to mirror 46. This alternative can be useful even if chromatic correction is not required, as it is more compact than those in which there is a single refocussing lens 36.

The invention claimed is:

1. An optical imaging device for splitting an initial image into at least two images with different optical characteristics, wherein the device comprises a beam splitter to create first and second optical pathways respectively incident on first and second reflectors carried on a centrally pivoted rotatable arm, the first and second reflectors are moveable along the arm whilst held in fixed relationship to each other, thereby to adjust separation of the first and second optical pathways, and a third reflector in fixed relationship to the beam splitter is positioned to intersect the first and second optical pathways with the orientation of the third reflector adjustable dependent on whether an input beam of the device is to be parallel or at right angles to an output beam.

2. An optical imaging device according to claim 1, wherein the third reflector is positioned adjacent where the first and second optical pathways intersect so as to deflect one optical pathway to a first focussing element for recombination with the other optical pathway.

3. An optical imaging device according to claim 1, wherein the third reflector is positioned just before the intersection of the first and second optical pathways.

4. An optical imaging device according to claim 3, wherein an edge of the third reflector is cut away at an angle to avoid any obstruction to the undeflected optical pathway.

5. An optical imaging device according to claim 1, wherein the third reflector is positioned just after the point of intersection of the first and second optical pathways.

6. An optical imaging device according to claim 1, wherein additional optical elements are placed in the optical pathways.

7. An optical imaging device according to claim 1, wherein the reflectors are minors.

* * * * *